UNITED STATES PATENT OFFICE.

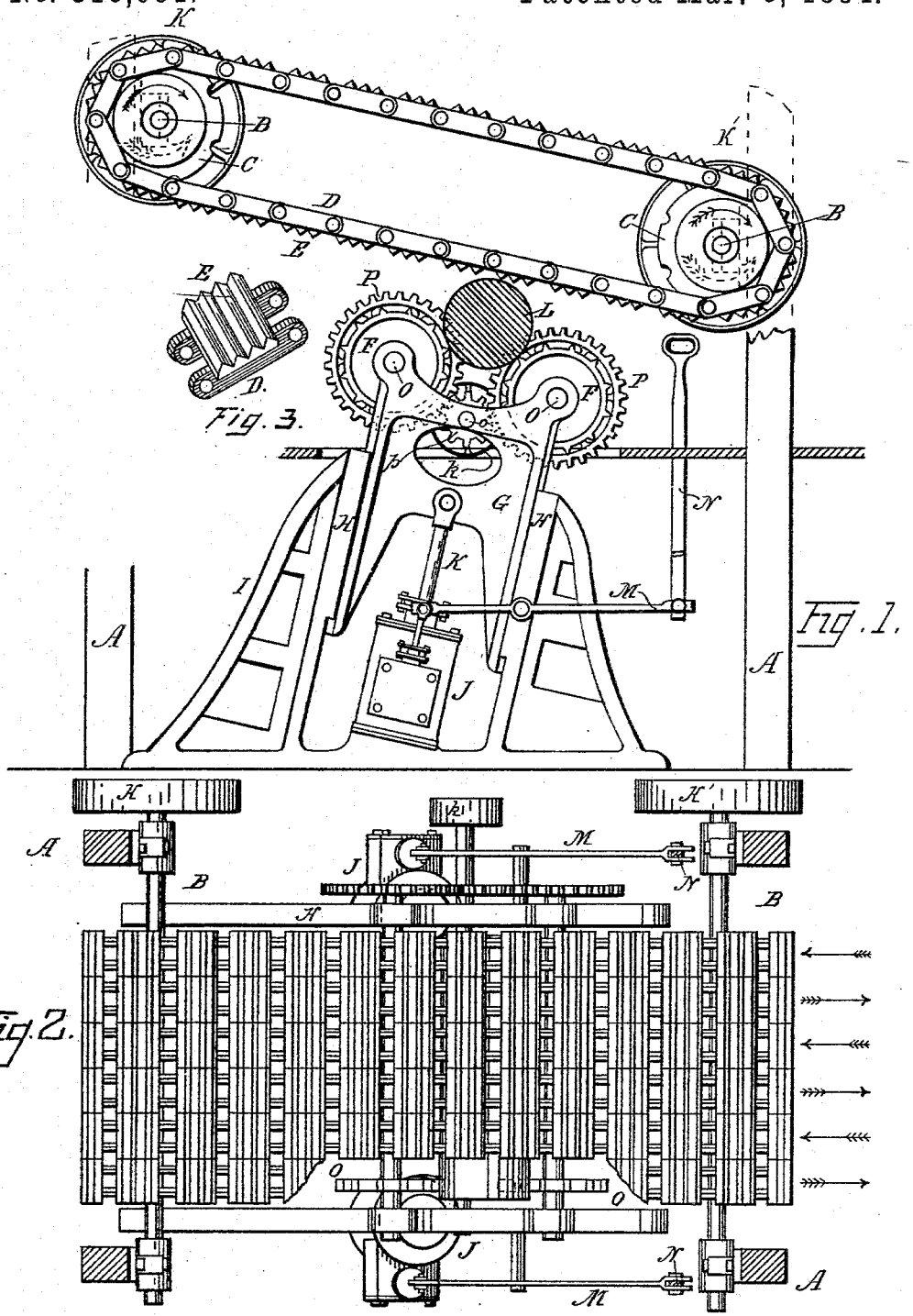

EDWARD C. HARGRAVE, OF BAY CITY, MICHIGAN.

ROSSING LOGS.

SPECIFICATION forming part of Letters Patent No. 516,091, dated March 6, 1894.

Application filed April 11, 1893. Serial No. 469,973. (No model.)

*To all whom it may concern:*

Be it known that I, EDWARD C. HARGRAVE, of Bay City, in the county of Bay and State of Michigan, have invented a new and useful Improvement in Rossing-Machines, of which the following is a specification.

My invention consists in an improvement in rossing machines, hereinafter fully described and claimed.

Figure 1 is a side elevation partly in section. Fig. 2 is a top plan view, partly broken away, and Fig. 3 is an enlarged perspective of one link of the chain with its grinding teeth.

This application shows and describes a machine whose method of operation is substantially the same as that of a reciprocating machine shown and described in an application filed cotemporaneously herewith, Serial No. 469,974, in which application I have the broad claim for the method applicable to both of said machines, and therefore in this application I restrict my claims to the mechanical structure.

A A represent uprights of a suitable frame, near the top of which are journaled on opposite sides of the frame two shafts B B, one or both of which is driven through pulleys K K' by belts from a suitable source of power, which I have not deemed necessary to illustrate.

C C represent sprocket wheels on said shafts B B, and D D represent endless chains carried on said sprocket wheels, the link of each chain being provided with a series of blunt V-shaped scraping or grinding teeth E, shown on a larger scale in the detached drawings in Fig. 1. The shafts B B are made long enough to carry enough chains D to cover the surface of the longest log which the machine is intended to ross, and all of said chains may move in the same direction if desired, but I prefer to move them alternately in opposite directions, as shown by the arrows in Fig. 2, and this I do by making the alternate sprocket wheels C on each shaft tight and loose, so that every alternate sprocket wheel on each shaft B will be driven by said shaft, the intermediate sprocket wheel revolving loosely on said shaft and in a direction opposite to said shaft deriving their motion from the fact that on the other shaft B the tight and loose pulleys are reversed and the motion of said shafts is reversed. Thus in Fig. 1 the sprocket wheel C at the left hand is represented as fast, while the opposite sprocket wheel C on the other shaft is loose and revolves in a contrary direction, being driven by a chain D.

L represents a log which may be raised to the action of the chain D with their teeth E in any desired manner, the means shown in the drawings being four toothed rolls F carried in pairs at the sides of the machine upon sliding cross-heads G operating in slides H in a frame I, and raised or lowered by the steam cylinder J provided with a piston and piston rod K connected directly with said cross head, the valve of said steam cylinder being operated by means of a lever M and handle N. In practice, I place one of these lifting devices at each end of the machine as shown in Fig. 2, so as to lift both ends of the log evenly and by this means I am enabled to press a log against the chains D to permit the weight of said chains to partially rest upon a log. The shafts O of the toothed supporting wheels F or one of said shafts, may be driven by a belt or by gears P P meshing with an intermediate pinion $p$ upon a shaft $o$ provided with a pulley $k$, to rotate the log upon the toothed wheels F, and raised as shown in Fig. 1 into contact with the chains D, said chains are put in motion by rotating the shafts B B, and as they are drawn across the log L, remove the bark therefrom by a scraping or grinding action in contradistinction to a cutting or planing action, thereby removing the bark rapidly without injury to the timber, and I have found by actual practice that this mode of removing the bark from a log is more preferable and more economical than removing it in the ordinary way by currying or planing.

What I claim as my invention, and desire to secure by Letters Patent, is—

1. In a rossing machine the combination with a series of endless chains carrying blunt scraping or grinding teeth and means for imparting motion to said chains, of means for supporting a log in contact with said chains, substantially as shown and described.

2. In a machine for removing bark from logs the combination with a series of endless chains carrying blunt scraping or grinding teeth, of means for rotating said chains alternately, and means for supporting a log in contact with said chains, substantially as shown and described.

3. In a rossing machine the combination with a series of endless chains carrying blunt scraping or grinding teeth and means for imparting motion to said chains, of means for supporting a log in contact with said chains, and means substantially as described for rotating the log while in contact with said chains, substantially as shown and described.

EDWARD C. HARGRAVE.

Witnesses:
A. B. LENNOX,
M. L. COURTRIGHT.